L. & L. J. Lamb.
Shearing Metal.
Nº 4,846.   Patented Nov. 10, 1846.
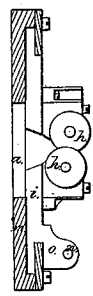
Fig. 3.
Fig. 1.
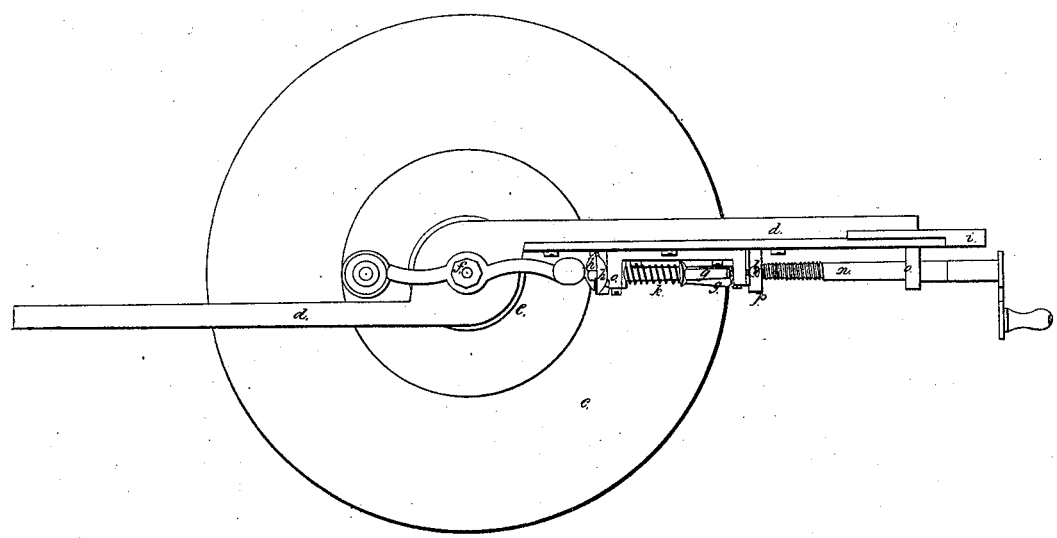
Fig. 2.
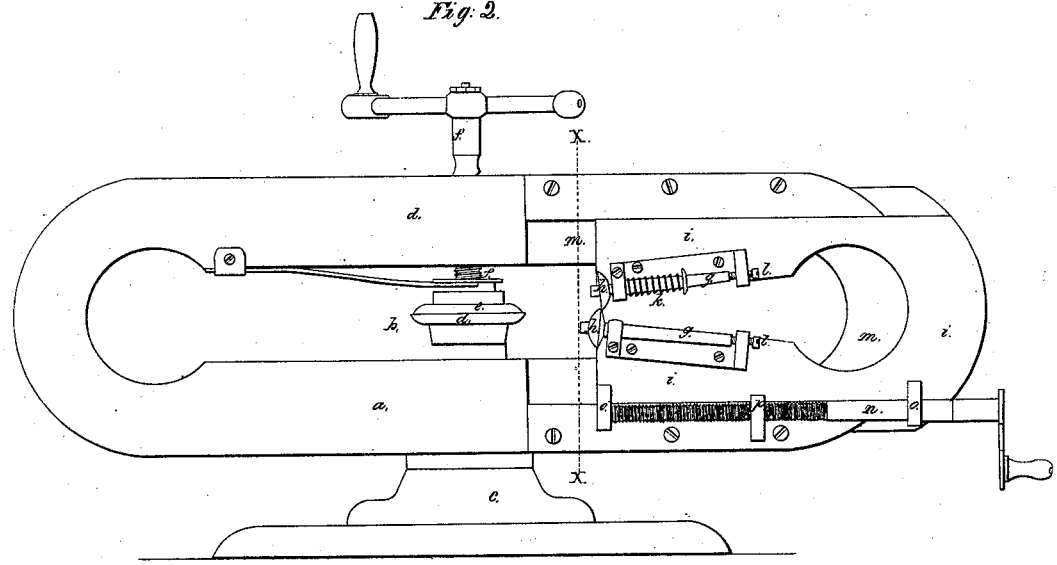

UNITED STATES PATENT OFFICE.

L. LAMB AND L. J. LAMB, OF BERLIN, CONNECTICUT.

ROTARY SHEARS.

Specification of Letters Patent No. 4,846, dated November 10, 1846.

*To all whom it may concern:*

Be it known that we, LOOMIS LAMB and LOCKWOOD J. LAMB, of Berlin, in the county of Hartford and State of Connecticut, have invented new and useful Improvements in Rotary Shears for Cutting Sheet Metal, and that the following is a full, clear, and exact description of the principle or character thereof which distinguishes them from all other things before known and of the manner of making, constructing, and using the same, reference being had to the accompanying drawings, making part of this specification, in which—

Figure 1 is a plan of the machine; Fig. 2, an elevation; and Fig. 3, a vertical section, taken at the line (X X) of Fig. 2.

The same letters indicate like parts in all the figures.

For the purpose of shearing large plates of metal, and particularly circular plates, the frame of the machine which supports the shears has been made with an opening of sufficient length to admit the sheet of metal to pass through it freely, the spindles of the clamps for securing and holding the plates while under the operation of the shears being made to pass through this frame at right angles to the length of the opening, the said frame for cutting circular plates being made to turn on spindles to form the center of the circle to be cut. And the arbors of the rotating shears have been placed parallel to each other, either requiring the rotating shears to be made of great diameter to permit the passage of the part of the plate sheared off which always curls up, or the workman attending the machine was required to give constant attendance to prevent the curled part of the plate from catching in the arbors of the shears. To prevent this, the rotating shears have been made of larger diameter, but this renders them more liable to spring, and cut imperfectly. Another objection arises from the fact that the shears have heretofore been separately connected with the frame, so that in setting them for different sizes of work they are required to be set separately, which at each change requires the resetting of the cutting edges. With the view to remove these objections, we attach the bearings of the two rotary shears to a plate (slotted out for the passage of the sheet of metal to be cut), and adapt it to the main frame in such manner as to have it slide toward or from the clamp that holds the sheet to be cut, so that by the turning of a set screw the cutters can be set for the cutting of a sheet of any size within the capacity of the main frame. We also set the arbors of the two rotating shears obliquely to, instead of parallel with the plane of the sheet to be operated on, that end to which the shears are attached being nearest together, so that the space between them, beyond the shears, shall be sufficiently far apart to leave a free passage for that part of the sheet which is to be cut away; and, in consequence of this obliquity of the arbors the face of one of the shears must be beveled to correspond. And for the purpose of adjusting the cutting faces of the shears to each other, we make one of the arbors free to slide endwise in its bearings, with a helical spring around it to draw the face of this shear from the other and employ a screw that bears against the end of the arbor to set the cutting edges.

In the accompanying drawings, (*a*) represents the bow frame made with a long opening (*b*) in it, and sustained on a spindle projecting from the standard (*c*), the upper end of this spindle being connected with a plate (*d*) which, in connection with a corresponding plate (*e*) above, constitutes a clamp for holding the sheet of metal to be cut, the upper plate (*e*) turning freely on the lower end of a clamp screw (*f*) that passes through the upper part of the bow frame, so that when a sheet of metal is clamped in the machine the bow frame can turn on the spindle and on the end of the screw, to carry the shears around while the sheet remains permanent. The arbors (*g*, *g*) of the rotating shears (*h*, *h*) turn in studs attached to the sliding plate (*i*) on each side of a slot; they are inclined, as represented in the drawings, the ends to which the shears are attached being the nearest together, and the face of one of the shears is beveled to correspond with the obliquity of the arbors, and to adapt the edges to each other to form shears. The arbor of one of them is free to move endwise in its bearings, and has a helical spring (*k*) around it which bears against the stud, and a shoulder on the arbor to draw this shear from the other, a screw (*l*) being employed to bear against the end of the arbor to adjust the cutting edges to each other. The plate (*i*) slides within the bow frame, which is cut out as at (*m, m*) to receive it, and is moved in and out by means of a screw (*n*), that turns in studs (*o, o*) that project from the bow frame, the plate being provided with a nut (*p*) in which the screw is tapped.

From the foregoing it will be obvious that when a sheet of metal is clamped between the two clamp plates (*d, e*), and the rotating shears are adjusted by the set screw (*n*), at any required distance from the center of the clamp plates to determine the diameter, the circle corresponding will be cut by simply turning the low frame on the spindle, which carries around the shears, which in cutting, rotate on their arbors.

The mode of enlarging the space between the arbors of the shears for the passage of the part of the sheet that is being cut off, (by inclining the arbors of the shears and beveling the face of one of them), the mode of adjusting the cutting edges of the two shears to each other, and the mode of setting the shears to the cutting of various sizes, are, as must be evident, applicable to other machines for cutting sheet metal; and therefore, we wish it to be distinctly understood that we do not limit ourselves to the application of these, or either of them, to the cutting of circles simply, but to the cutting of other forms, whether the parts be mounted in a bow frame turning on the spindles of the clamps, or in any other manner, provided the character of our improvements, herein pointed out, be retained.

What we claim as our invention and desire to secure by Letters Patent, is—

1. The inclination of the two arbors of the rotating shears to the plane of the plate to be sheared so as to leave a free passage for that part of the sheet that is being cut off, in combination with the beveled face of one of the shears, as herein described.

2. We also claim the mode of setting the cutting edges of the shears to each other, by having the arbor of one of them to slide in its bearings and forced up by a set screw in combination with the spring that draws it from the other cutter to prevent the injurious action of the cutting edges on each other and to admit of their relative adjustment of the two cutters as described.

LOOMIS LAMB.
LOCKWOOD J. LAMB.

Witnesses:
JAMES D. CARPENTER,
EMILIUS L. BECKLEY.